United States Patent
Gumbmann et al.

(10) Patent No.: US 12,078,727 B2
(45) Date of Patent: Sep. 3, 2024

(54) IMAGING SYSTEM AND METHOD FOR MATERIAL CHARACTERIZATION OF A SAMPLE

(71) Applicant: Rohde & Schwarz GmbH & Co. KG, Munich (DE)

(72) Inventors: Frank Gumbmann, Nuremberg (DE); Benedikt Simper, Munich (DE); Gerhard Hamberger, Griesstaett (DE); Andreas Vonloesecke, Tutzing (DE); Matthias Beer, Neubiberg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 963 days.

(21) Appl. No.: 17/066,185

(22) Filed: Oct. 8, 2020

(65) Prior Publication Data

US 2022/0082695 A1    Mar. 17, 2022

(30) Foreign Application Priority Data

Sep. 14, 2020 (EP) .................................... 20195911

(51) Int. Cl.
*G01S 17/89* (2020.01)
*G01S 7/4863* (2020.01)
*G01S 17/00* (2020.01)
*H01Q 1/42* (2006.01)

(52) U.S. Cl.
CPC ............ *G01S 17/89* (2013.01); *G01S 7/4863* (2013.01); *G01S 17/003* (2013.01); *H01Q 1/42* (2013.01)

(58) Field of Classification Search
CPC ...... G01S 17/89; G01S 7/4863; G01S 17/003; G01S 7/4004; G01S 13/87; G01S 7/411; H01Q 1/42

USPC ......................................................... 356/4.01
See application file for complete search history.

(56) References Cited

U.S. PATENT DOCUMENTS

| 5,212,447 A | 5/1993 | Paltiel |
| 6,184,842 B1 | 2/2001 | Leinweber et al. |
| 6,864,826 B1 | 3/2005 | Stove |
| 7,791,355 B1 | 9/2010 | Esher et al. |
| 2002/0158639 A1 | 10/2002 | Nakashiba et al. |

(Continued)

FOREIGN PATENT DOCUMENTS

| CN | 102707155 A | 10/2012 |
| CN | 103728321 A | 4/2014 |

(Continued)

OTHER PUBLICATIONS

European Office Action for related European Patent Application No. 20195911.1-1206 dated Mar. 4, 2021, 7 Pages.

*Primary Examiner* — Daniel L Murphy
(74) *Attorney, Agent, or Firm* — DITTHAVONG, STEINER & MLOTKOWSKI

(57) ABSTRACT

An imaging system for material characterization of a sample is provided. Said imaging system comprises at least two imaging arrays configured to form at least one imaging array pair. In this context, the imaging system is configured to perform at least one reflection measurement with the aid of at least one imaging array. Furthermore, the imaging system is configured to perform at least one transmission measurement with the aid of the at least one imaging array pair. In addition to this, the imaging system is configured to determine material characteristics of the sample on the basis of the at least one reflection measurement and/or the at least one transmission measurement.

13 Claims, 3 Drawing Sheets

(56) References Cited

U.S. PATENT DOCUMENTS

| | | |
|---|---|---|
| 2003/0071623 A1 | 4/2003 | Marek |
| 2006/0066856 A1 | 3/2006 | Cumming et al. |
| 2007/0046289 A1 | 3/2007 | Troxler |
| 2007/0056396 A1 | 3/2007 | Mawer |
| 2010/0007362 A1 | 1/2010 | Booth et al. |
| 2010/0039346 A1 | 2/2010 | Peter et al. |
| 2013/0049769 A1 | 2/2013 | Grimm et al. |
| 2013/0063158 A1 | 3/2013 | Potrepka et al. |
| 2013/0139596 A1 | 6/2013 | Lowe et al. |
| 2013/0321620 A1 | 12/2013 | Kim et al. |
| 2014/0266929 A1 | 9/2014 | Huyun et al. |
| 2014/0327429 A1 | 11/2014 | Ziomek et al. |
| 2017/0242119 A1 | 8/2017 | Chekroun et al. |
| 2017/0329002 A1 | 11/2017 | Koerber et al. |
| 2017/0356941 A1 | 12/2017 | Ahmed et al. |
| 2018/0306903 A1 | 10/2018 | Heuel et al. |
| 2019/0219623 A1 | 7/2019 | Varel et al. |
| 2019/0383935 A1 | 12/2019 | Ahmed et al. |
| 2019/0391233 A1 | 12/2019 | Park et al. |
| 2020/0064442 A1 | 2/2020 | Park et al. |

FOREIGN PATENT DOCUMENTS

| | | |
|---|---|---|
| CN | 110596466 A | 12/2019 |
| CN | 111157806 A | 5/2020 |
| DE | 102012020494 B3 | 1/2014 |
| DE | 102017202214 A1 | 8/2018 |
| DE | 10 2018 216 032 A1 | 3/2020 |
| EP | 0921404 A2 | 6/1999 |
| EP | 2341332 A1 | 7/2011 |
| EP | 3258288 A1 | 12/2017 |
| EP | 3392669 A1 | 10/2018 |
| IN | 104155527 A | 11/2014 |
| JP | 2004194974 A | 7/2004 |
| KR | 100962591 B1 | 6/2010 |
| KR | 20200018247 A | 2/2020 |
| SU | 1423966 A2 | 9/1988 |
| TW | I684771 B | 2/2020 |
| WO | 2015172771 A1 | 11/2015 |
| WO | 2019046689 A1 | 3/2019 |
| WO | 2020074667 A1 | 4/2020 |

IMAGING SYSTEM AND METHOD FOR MATERIAL CHARACTERIZATION OF A SAMPLE

PRIORITY

This application claims priority of the European patent application EP 20 195 911.1 filed on Sep. 14, 2020, which is incorporated by reference herewith.

FIELD OF THE INVENTION

The invention relates to an imaging system for material characterization of a sample and an imaging method for material characterization of a sample.

BACKGROUND OF THE INVENTION

Generally, in times of an increasing number of applications employing radar systems comprising radar covers such as autonomous vehicles comprising radomes, there is a growing need of an imaging system for material characterization of a sample and an imaging method for material characterization of a sample in order to ensure a correct functioning of such applications especially on the basis of a highly accurate and efficient material characterization with respect to a sample such as said radomes.

WO 2020/074667 A1 relates to a radome measuring system configured to perform a radome measurement. Said system comprises a transmission antenna on one side of a radome, wherein said transmission antenna is configured for emitting electromagnetic waves, and a receiving antenna on another side of the radome, wherein said receiving antenna is configured for receiving electromagnetic waves, and a measuring device being configured to measure a difference between the transmitted and received electromagnetic waves for inferring a feature of a radome being positioned between the transmission antenna and the receiving antenna. Ns it can be seen, due to the foregoing arrangement and configuration, said radome measuring system exclusively allows for a transmission measurement, which disadvantageously leads to an inaccurate and inefficient characterization of the radome.

Accordingly, there is a need among others to provide an imaging system for material characterization of a sample and an imaging method for material characterization of a sample, whereby both a high accuracy and efficiency are ensured with respect to the material characterization of the sample such as a radome.

SUMMARY OF THE INVENTION

According to a first aspect of the invention, an imaging system for material characterization of a sample is provided. Said imaging system comprises at least two imaging arrays configured to form at least one imaging array pair. In this context, the imaging system is configured to perform at least one reflection measurement with the aid of at least one imaging array. Furthermore, the imaging system is configured to perform at least one transmission measurement with the aid of the at least one imaging array pair. In addition to this, the imaging system is configured to determine material characteristics of the sample on the basis of the at least one reflection measurement and/or the at least one transmission measurement. Advantageously, both a high accuracy and efficiency are ensured with respect to the material characterization of the sample.

According to a first preferred implementation form of the first aspect of the invention, at least one, preferably each, of the at least two imaging arrays comprises or is a monostatic or multistatic array. Advantageously, for instance, accuracy can further be increased.

According to a second preferred implementation form of the first aspect of the invention, the sample comprises or is a device under test or a radome. Advantageously, for example, a high flexibility can be ensured.

According to a further preferred implementation form of the first aspect of the invention, the respective imaging arrays of the corresponding imaging array pair are arranged in a manner that said respective imaging arrays face each other. Advantageously, for instance, efficiency can further be increased.

According to a further preferred implementation form of the first aspect of the invention, the at least two imaging arrays, preferably the respective imaging arrays of the corresponding imaging array pair, are synchronized and/or phase coherent. Advantageously, for example, inaccuracies can be reduced in an efficient manner.

According to a further preferred implementation form of the first aspect of the invention, at least one, preferably each, of the at least two imaging arrays is placed at a desired angle of incidence. Advantageously, for instance, efficiency can further be increased.

According to a further preferred implementation form of the first aspect of the invention, the imaging system is configured to determine the electrical thickness across the sample and/or homogeneity information with respect to the sample on the basis of the at least one transmission measurement, preferably on corresponding phase information thereof. Advantageously, for example, flexibility can further be increased, which leads to reduced inefficiencies.

According to a further preferred implementation form of the first aspect of the invention, the imaging system is configured to present the at least one transmission measurement and/or the at least one reflection measurement as at least one image especially in order to provide information regarding variations across the corresponding material plane of the sample. Advantageously, for instance, such a presentation or visualization, respectively, further increases efficiency due to a simple interpretation of the measurements.

According to a further preferred implementation form of the first aspect of the invention, the imaging system is configured to realize small incident angles especially by using a proper ratio between a respective aperture dimension and a corresponding sample distance. Advantageously, for example, vector network analyzer comparable reflectivity and transmissivity measurements can be ensured, which leads to an increased efficiency.

According to a further preferred implementation form of the first aspect of the invention, the aperture dimension is significantly smaller than the sample distance. Advantageously, for instance, the proper ratio between the aperture dimension and the sample distance can be chosen in an efficient manner.

According to a further preferred implementation form of the first aspect of the invention, the imaging system is configured to determine measurement results being comparable to reference measurement results provided by a common measurement device, preferably a vector network analyzer. Advantageously, for example, not only efficiency but also accuracy can be increased.

According to a further preferred implementation form of the first aspect of the invention, with respect to the at least one reflection measurement and/or the at least one transmission measurement, the imaging system is configured to perform at least one broadband measurement across several frequencies especially in order to determine a frequency response for various locations of the sample. Advantageously, for instance, a frequency sweep may be applied in order to ensure a high efficiency.

According to a further preferred implementation form of the first aspect of the invention, the imaging system is configured to determine the permittivity, preferably the relative permittivity, of the sample on the basis of the frequency response. Advantageously, for example, flexibility of measurements can further be increased, which reduces inefficiencies.

According to a second aspect of the invention, an imaging method for material characterization of a sample is provided. Said imaging method comprises the steps of forming at least one imaging array pair with the aid of at least two imaging arrays, performing at least one reflection measurement with the aid of at least one of the at least two imaging arrays, performing at least one transmission measurement with the aid of at least one of the at least one imaging array pair, and determining material characteristics of the sample on the basis of the at least one reflection measurement and/or the at least one transmission measurement. Advantageously, both a high accuracy and efficiency are ensured with respect to the material characterization of the sample.

According to a first preferred implementation form of the second aspect of the invention, the imaging method further comprises the step of determining the electrical thickness across the sample and/or homogeneity information with respect to the sample on the basis of the at least one transmission measurement, preferably on corresponding phase information thereof. Advantageously, for example, flexibility can further be increased, which leads to reduced inefficiencies.

According to a second preferred implementation form of the second aspect of the invention, at least one, preferably each, of the at least two imaging arrays comprises or is a monostatic or multistatic array. Advantageously, for instance, accuracy can further be increased.

According to a further preferred implementation form of the second aspect of the invention, the sample comprises or is a device under test or a radome. Advantageously, for example, a high flexibility can be ensured.

According to a further preferred implementation form of the second aspect of the invention, the imaging method further comprises the step of arranging the respective imaging arrays of the corresponding imaging array pair in a manner that said respective imaging arrays face each other. Advantageously, for instance, efficiency can further be increased.

According to a further preferred implementation form of the second aspect of the invention, the at least two imaging arrays, preferably the respective imaging arrays of the corresponding imaging array pair, are synchronized and/or phase coherent. Advantageously, for example, inaccuracies can be reduced in an efficient manner.

According to a further preferred implementation form of the second aspect of the invention, the imaging method further comprises the step of placing at least one, preferably each, of the at least two imaging arrays at a desired angle of incidence. Advantageously, for instance, efficiency can further be increased.

According to a further preferred implementation form of the second aspect of the invention, the imaging method further comprises the step of presenting the at least one transmission measurement and/or the at least one reflection measurement as at least one image especially in order to provide information regarding variations across the corresponding material plane of the sample. Advantageously, for instance, such a presentation or visualization, respectively, further increases efficiency due to a simple interpretation of the measurements.

According to a further preferred implementation form of the second aspect of the invention, the imaging method further comprises the step of realizing small incident angles especially by using a proper ratio between a respective aperture dimension and a corresponding sample distance. Advantageously, for example, vector network analyzer comparable reflectivity and transmissivity measurements can be ensured, which leads to an increased efficiency.

According to a further preferred implementation form of the second aspect of the invention, the aperture dimension is significantly smaller than the sample distance. Advantageously, for instance, the proper ratio between the aperture dimension and the sample distance can be chosen in an efficient manner.

According to a further preferred implementation form of the second aspect of the invention, the imaging method further comprises the step of determining measurement results being comparable to reference measurement results provided by a common measurement device, preferably a vector network analyzer. Advantageously, for example, not only efficiency but also accuracy can be increased.

According to a further preferred implementation form of the second aspect of the invention, with respect to the at least one reflection measurement and/or the at least one transmission measurement, the imaging method further comprises the step of performing at least one broadband measurement across several frequencies especially in order to determine a frequency response for various locations of the sample. Advantageously, for instance, a frequency sweep may be applied in order to ensure a high efficiency.

According to a further preferred implementation form of the second aspect of the invention, the imaging method further comprises the step of determining the permittivity, preferably the relative permittivity, of the sample on the basis of the frequency response. Advantageously, for example, flexibility of measurements can further be increased, which reduces inefficiencies.

BRIEF DESCRIPTION OF THE DRAWINGS

Exemplary embodiments of the invention are now further explained with respect to the drawings by way of example only, and not for limitation. In the drawings.

Figure 1:
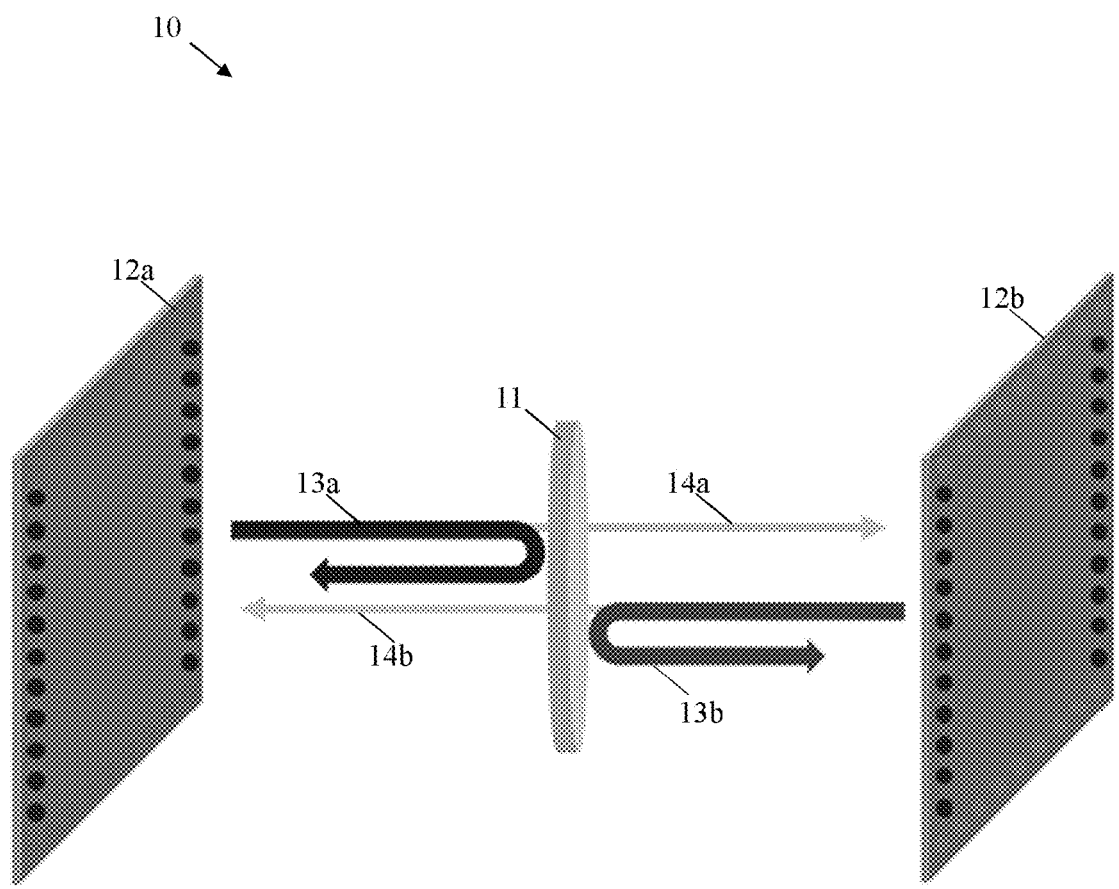
FIG. 1 shows a first exemplary embodiment of an inventive imaging system.

With respect to FIG. 1, a block diagram of an exemplary embodiment of an inventive imaging system 10 for material characterization of a sample 11 is shown. According to FIG. 1, the imaging system 10 comprises at least two imaging arrays, exemplarily the two imaging arrays 12a, 12b, configured to form at least one imaging array pair. In this context, the imaging system 10 is configured to perform at least one reflection measurement, exemplarily the two reflection measurements 13a, 13b, with the aid of the corresponding imaging array 12a or 12b, respectively.

Furthermore, the imaging system 10 is configured to perform at least one transmission measurement, exemplarily the two transmission measurements 14a, 14b, with the aid of the corresponding imaging array pair, which exemplarily comprises the two imaging arrays 12a and 12. Moreover, the imaging system 10 is basically configured to determine material characteristics of the sample 11 on the basis of at least one of the two exemplary reflection measurements 13a, 13b and/or at least one of the two exemplary transmission measurements 14a, 14b.

Exemplarily, the imaging system 10 is preferably configured to determine the material characteristics of the sample 11 on the basis of the two exemplary reflection measurements 13a, 13b and the two exemplary transmission measurements 14a, 14b. It is noted that it might be particularly advantageous if the corresponding result of the at least one reflection measurement and/or the at least one transmission measurement is formulated and/or interpreted as at least one scattering parameter.

DETAILED DESCRIPTION OF PREFERRED EMBODIMENTS

In the context of the first exemplary embodiment according to FIG. 1, the reflection measurement 13a may result in a first reflection coefficient $S_{11}$, whereas the reflection measurement 13b may result in a second reflection coefficient $S_{22}$. By analogy therewith, the transmission measurement 14a may result in a first transmission coefficient $S_{21}$, whereas the transmission measurement 14b may result in a second transmission coefficient $S_{12}$.

With respect to the imaging arrays 12a and 12b, it is noted that at least one, preferably each, of the two imaging arrays 12, 12b may comprise or be a monostatic or multistatic array. Exemplarily, both imaging arrays 12a, 12b are multistatic arrays.

In this context, it is further noted that at least one, especially each, of said imaging arrays 12a, 12b may comprise between 50 and 150 transmitting elements and/or between 50 and 150 receiving elements, preferably between 80 and 120 transmitting elements and/or between 80 and 120 receiving elements, more preferably between 90 and 100 transmitting elements and/or between 90 and 100 receiving elements, most preferably 94 transmitting elements and/or 94 receiving elements.

Alternatively, at least one, especially each, of said imaging arrays 12a, 12b may comprise between 50 and 150 transceiving elements, preferably between 80 and 120 transceiving elements, more preferably between 90 and 100 transceiving elements, most preferably 94 transceiving elements. With respect to the sample 11, it is noted that the sample 11 may especially comprise or be a device under test or a radome.

As it can further be seen from FIG. 1, the respective imaging arrays 12a, 12b of the corresponding imaging array pair are arranged in a manner that said respective imaging arrays 12a, 12b face each other. In this context, it is noted that a distance between the imaging arrays 12a, 12b may be between 0.2 and 2 meters, preferably between 0.3 and 1.5 meters, more preferably between 0.4 and 0.8 meters, most preferably 0.6 meters.

It is further noted that it might be particularly advantageous if the two imaging arrays 12a, 12b forming the corresponding imaging array pair are synchronized and/or phase coherent. In this context, it is noted that said synchronization and/or phase coherence can be achieved with the aid of the same signal source. Alternatively, said synchronization and/or phase coherence can be achieved with the aid of separate signal sources being synched such as at least two signal sources being synched.

It is further noted that said same signal source may preferably comprise or be a direct digital synthesizer (DDS). Alternatively, at least one, especially each, of said separate signal sources may comprise or be a direct digital synthesizer.

Again, with respect to the imaging arrays 12a, 12b, it is noted that the imaging arrays 12a, 12b are placed at a desired angle of incidence. With respect to the imaging system 10, it is noted that the imaging system 10 may preferably be configured to determine the electrical thickness across the sample 11 and/or homogeneity information with respect to the sample 11 on the basis of the at least one transmission measurement 14a, 14b, preferably on corresponding phase information thereof.

In addition to this or as an alternative, the imaging system may be configured to present the at least one transmission measurement 14a, 14b and/or the at least one reflection measurement 13a, 13b as at least one image especially in order to provide information regarding variations across the corresponding material plane of the sample 11.

Further additionally or further alternatively, the imaging system 10 may preferably be configured to realize small incident angles especially by using a proper ratio between a respective aperture dimension and a corresponding sample distance. In this context, it might be particularly advantageous if the aperture dimension is significantly smaller than the sample distance.

Furthermore, the imaging system 10 may especially be configured to determine measurement results being comparable to reference measurement results provided by a common measurement device, preferably a vector network analyzer.

It is noted that especially in the case of a multistatic array and a proper measurement setup, the respective transmission and reflection measurement may preferably be equivalent to a single incidence measurement, which may advantageously lead to comparable results to reference setups especially with a vector network analyzer.

In the context of said proper measurement setup, it might be particularly advantageous if the aperture dimension is significantly smaller than the sample distance as already mentioned above. With the aid of such a configuration, small angles of incidence and reflection may preferably be realized.

Moreover, with respect to the at least one reflection measurement 13a, 13b and/or the at least one transmission measurement 14a, 14b, the imaging system 10 may be configured to perform at least one broadband measurement across several frequencies especially in order to determine a frequency response for various locations of the sample 11.

In this context, it is noted that said broadband measurement can be achieved with the aid of a frequency sweep and/or a pulse measurement preferably by means of a coherent pulse detector. It is further noted that it might be particularly advantageous if the respective frequency range of said broadband measurement is between 50 and 100 gigahertz, preferably between 60 and 90 gigahertz, more preferably between 70 and 80 gigahertz, most preferably between 74 and gigahertz. Furthermore, the imaging system 10 may especially be configured to determine the permittivity, preferably the relative permittivity, of the sample 11 on the basis of the frequency response.

The first exemplary embodiment of the inventive imaging system according to FIG. 1, which comprises two arrays, can especially be used in the context of a material characterization of a sample for a single incident angle. The second exemplary embodiment according to FIG. 2, which comprises multiple arrays, can especially be used in the context of a material characterization of a sample for multiple incident angles. Before said second exemplary embodiment will be explained in greater detail in the following, it is generally noted that with respect to a material characterization of a sample for at least two incident angles, it might be particularly advantageous if the imaging system comprises at least three, preferably at least four, imaging arrays.

Figure 2:
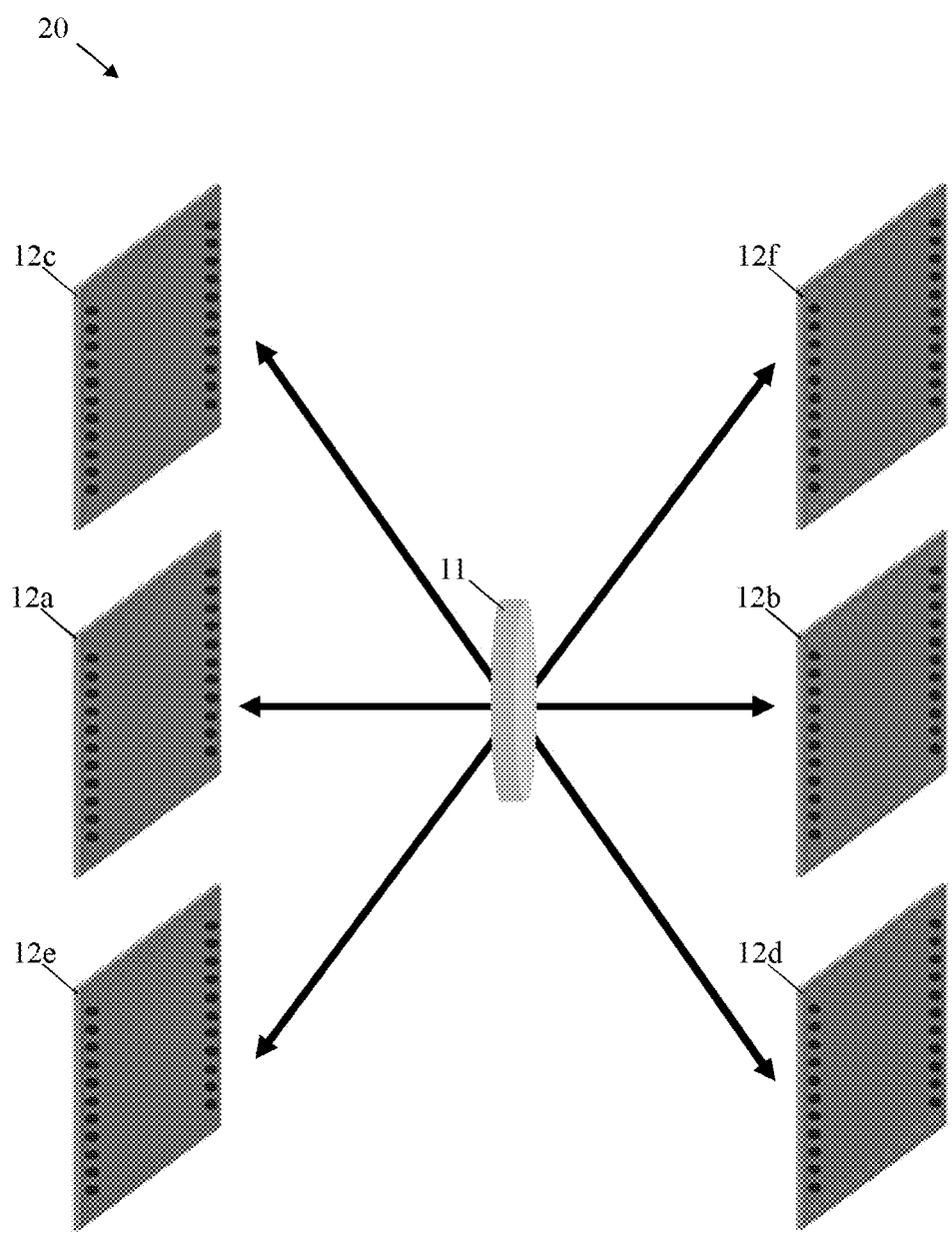
FIG. 2 shows a second exemplary embodiment of an inventive imaging system.

Now, with respect to the second exemplary embodiment, as it can be seen from FIG. 2, the respective imaging system 20 for material characterization of the sample 11 comprises multiple imaging arrays exemplarily six imaging arrays 12a, 12b, 12c, 12d, 12e, 12f, configured to form multiple imaging array pairs, exemplarily three imaging array pairs. In this exemplary case, the imaging arrays 12a and 12b form a first imaging array pair, the imaging arrays 12c and 12d form a second imaging array pair, and the imaging arrays 12e and 12f form a third imaging array pair. With respect to the second exemplary embodiment of FIG. 2, it is noted that the above explanations regarding the first exemplary embodiment according to FIG. 1 analogously apply.

Now, with respect to both the first exemplary embodiment of the inventive imaging system according to FIG. 1 and the second exemplary embodiment according to FIG. 2, it is generally noted that it might be particularly advantageous if the inventive imaging system comprises at least two imaging arrays, preferably full-electronic imaging arrays, especially with two-dimensional monostatic or multistatic sampling. Furthermore, measurements of two-dimensional reflection and transmission images especially with magnitude and phase information may be performed by the imaging system. Moreover, the imaging system may especially extract reflectivity and transmissivity from corresponding magnitude images.

It might be particularly advantageous if the imaging system is configured to extract homogeneity from the respective phase information of the corresponding transmission image. In this context, variation of phase values may especially correspond to variations of the electrical thickness of the sample. In addition to this or as an alternative, the imaging system may be configured to extract the respective frequency response of reflectivity and transmissivity especially for specific pixel positions and/or locations of the sample preferably in the case of a broadband setup.

Furthermore, it might be particularly advantageous if small incident angles are realized by a proper ratio between aperture dimension and sample distance especially in the case of multistatic arrays, which preferably results in vector network analyzer comparable reflectivity and transmissivity measurements. It is noted that the above general explanations regarding the first and the second exemplary embodiment of the inventive imaging system analogously apply for the exemplary embodiment of the inventive imaging method as described in the following.

Figure 3:
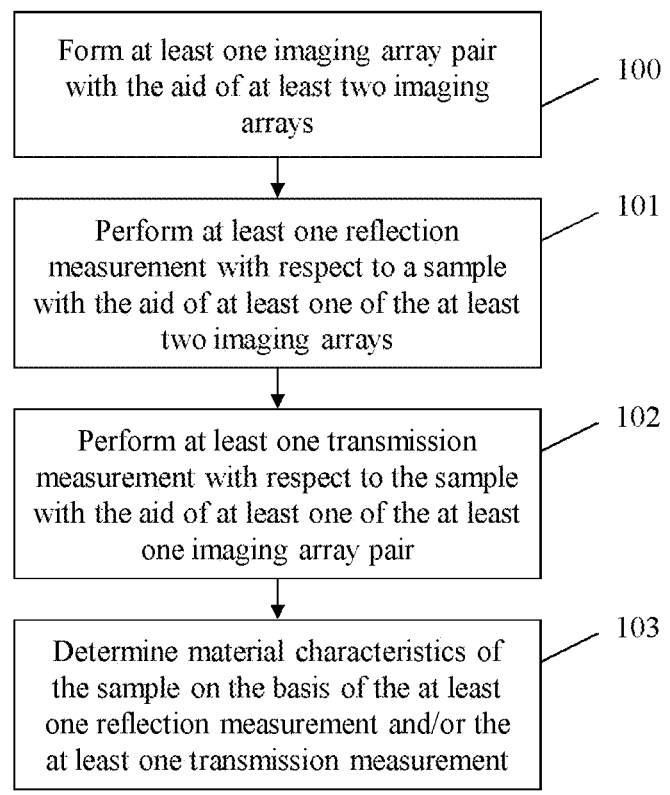
FIG. 3 shows a flow chart of an exemplary embodiment of an inventive imaging method.

Finally, FIG. 3 shows a flow chart of an exemplary embodiment of the inventive imaging method for material characterization of a sample. In a first step 100, at least one imaging array pair is formed with the aid of at least two imaging arrays. Then, in a second step 101, at least one reflection measurement is performed with respect to the sample with the aid of at least one of the at least two imaging arrays. Furthermore, in a third step 102, at least one transmission measurement is performed with respect to the sample with the aid of at least one of the at least one imaging array pair. In addition to this, in a fourth step 103, material characteristics of the sample are determined on the basis of the at least one reflection measurement and/or the at least one transmission measurement.

It might be particularly advantageous if the imaging method further comprises the step of determining the electrical thickness across the sample and/or homogeneity information with respect to the sample on the basis of the at least one transmission measurement, preferably on corresponding phase information thereof. With respect to the at least two imaging arrays, it is noted that at least one, preferably each, of the at least two imaging arrays may comprise or be a monostatic or multistatic array. With respect to the sample, it is noted that the sample may especially comprise or be a device under test or a radome.

Additionally or alternatively, the imaging method may further comprise the step of arranging the respective imaging arrays of the corresponding imaging array pair in a manner that said respective imaging arrays face each other. It is further noted that it might be particularly advantageous if the at least two imaging arrays, preferably the respective imaging arrays of the corresponding imaging array pair, are synchronized and/or phase coherent.

In this context, the imaging method may additionally or alternatively comprise the step of configuring the at least two imaging arrays, preferably the respective imaging arrays of the corresponding imaging array pair, in a manner that the at least two imaging arrays, preferably the respective imaging arrays of the corresponding imaging array pair, are synchronized and/or phase coherent. Furthermore, the imaging method may further comprise the step of placing at least one, preferably each, of the at least two imaging arrays at a desired angle of incidence.

Moreover, the imaging method may further comprise the step of presenting the at least one transmission measurement and/or the at least one reflection measurement as at least one image especially in order to provide information regarding variations across the corresponding material plane of the sample. In addition to this or as an alternative, the imaging method may further comprise the step of realizing small incident angles especially by using a proper ratio between a respective aperture dimension and a corresponding sample distance. In this context, the aperture dimension may preferably be significantly smaller than the sample distance.

Furthermore, it might be particularly advantageous if the imaging method further comprises the step of determining measurement results being comparable to reference measurement results provided by a common measurement device, preferably a vector network analyzer.

Additionally or alternatively, with respect to the at least one reflection measurement and/or the at least one transmission measurement, the imaging method may further comprise the step of performing at least one broadband measurement across several frequencies especially in order to determine a frequency response for various locations of the sample. In addition to this or as an alternative, the imaging method may comprise the step of determining the permittivity, preferably the relative permittivity, of the sample on the basis of the frequency response.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An imaging system for material characterization of a sample, the imaging system comprising:
   at least two imaging arrays configured to form at least one imaging array pair, wherein the imaging system is configured to perform at least one reflection measurement with the aid of at least one imaging array, each of the at least two imaging arrays comprising or being a two-dimensional monostatic or multistatic array,
   wherein the imaging system is configured to perform at least one transmission measurement with the aid of the at least one imaging array pair, and
   wherein the imaging system is configured to determine material characteristics of the sample on the basis of the at least one reflection measurement and/or the at least one transmission measurement.

2. The imaging system according to claim 1,
   wherein the sample comprises or is a device under test or a radome.

3. The imaging system according to claim 1,
   wherein the respective imaging arrays of the corresponding imaging array pair are arranged in a manner that said respective imaging arrays face each other.

4. The imaging system according to claim 1,
   wherein the respective imaging arrays of the corresponding imaging array pair are synchronized and/or phase coherent.

5. The imaging system according to claim 1,
   wherein each of the at least two imaging arrays is placed at a desired angle of incidence.

6. The imaging system according to claim 1,
   wherein the imaging system is configured to determine the electrical thickness across the sample and/or homogeneity information with respect to the sample on the basis of the at least one transmission measurement on corresponding phase information thereof.

7. The imaging system according to claim 1,
   wherein the imaging system is configured to present the at least one transmission measurement and/or the at least one reflection measurement as at least one image in order to provide information regarding variations across the corresponding material plane of the sample.

8. The imaging system according to claim 1,
   wherein the imaging system is configured to determine measurement results being comparable to reference measurement results provided by a vector network analyzer.

9. The imaging system according to claim 1,
   wherein with respect to the at least one reflection measurement and/or the at least one transmission measurement, the imaging system is configured to perform at least one broadband measurement across several frequencies in order to determine a frequency response for various locations of the sample.

10. The imaging system according to claim 9,
    wherein the imaging system is configured to determine the relative permittivity; of the sample on the basis of the frequency response.

11. An imaging method for material characterization of a sample, the imaging method comprising the steps of:
    forming at least one imaging array pair with the aid of at least two imaging arrays,
    performing at least one reflection measurement with the aid of at least one of the at least two imaging arrays,
    performing at least one transmission measurement with the aid of at least one of the at least one imaging array pair, and
    determining material characteristics of the sample on the basis of the at least one reflection measurement and/or the at least one transmission measurement.

12. The imaging method according to claim 11,
    wherein the imaging method further comprises the step of determining the electrical thickness across the sample and/or homogeneity information with respect to the sample on the basis of the at least one transmission measurement on corresponding phase information thereof.

13. An imaging system for material characterization of a sample, the imaging system comprising:
    at least two imaging arrays configured to form at least one imaging array pair, wherein the imaging system is configured to perform at least one two-dimensional reflection measurement with the aid of at least one imaging array, each of the at least two imaging arrays comprising or being a two-dimensional monostatic or multistatic array,
    wherein the imaging system is configured to perform at least one two-dimensional transmission measurement with the aid of the at least one imaging array pair, and
    wherein the imaging system is configured to determine material characteristics of the sample on the basis of the at least one two-dimensional reflection measurement and/or the at least one two-dimensional transmission measurement.

\* \* \* \* \*